United States Patent
Ikeda et al.

(10) Patent No.: US 12,381,410 B2
(45) Date of Patent: Aug. 5, 2025

(54) CHARGING DEVICE

(71) Applicant: TOYOTA JIDOSHA KABUSHIKI KAISHA, Toyota (JP)

(72) Inventors: Kosuke Ikeda, Toyota (JP); Shohei Oi, Okazaki (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 69 days.

(21) Appl. No.: 18/586,075

(22) Filed: Feb. 23, 2024

(65) Prior Publication Data

US 2024/0291307 A1    Aug. 29, 2024

(30) Foreign Application Priority Data

Feb. 27, 2023    (JP) .................................. 2023-028533

(51) Int. Cl.
| | |
|---|---|
| *H02J 7/00* | (2006.01) |
| *B60L 53/60* | (2019.01) |
| *H02P 27/08* | (2006.01) |
| *B60L 53/20* | (2019.01) |
| *B60L 53/24* | (2019.01) |

(52) U.S. Cl.
CPC .......... *H02J 7/00712* (2020.01); *B60L 53/60* (2019.02); *H02P 27/08* (2013.01); *B60L 53/20* (2019.02); *B60L 53/24* (2019.02)

(58) Field of Classification Search
CPC .......... H02J 2310/48; H02J 7/02; H02J 7/007; H02J 7/0047; H02J 7/0068; H02J 7/00714; H02J 7/007182; B60L 53/00; B60L 53/60; B60L 50/51; B60L 53/24; H02P 27/08; H02P 25/18; H02P 27/085; Y02T 10/70; Y02T 10/7072; H02M 7/5387
USPC .................................................. 307/9.1–10.2
See application file for complete search history.

(56) References Cited

U.S. PATENT DOCUMENTS

| | | | |
|---|---|---|---|
| 2010/0164416 A1* | 7/2010 | Yamada ................... | H02P 27/08 318/400.13 |
| 2013/0069492 A1* | 3/2013 | Rippel ..................... | B60L 53/24 310/68 D |
| 2019/0135132 A1* | 5/2019 | Brüll ........................ | B60L 50/51 |
| 2020/0298722 A1* | 9/2020 | Smolenaers ............ | H02J 7/345 |

(Continued)

FOREIGN PATENT DOCUMENTS

| | | | | |
|---|---|---|---|---|
| JP | 2018-093608 A | | 6/2018 | |
| KR | 102542948 B1 * | | 6/2023 | ............. B60L 53/11 |

*Primary Examiner* — Rexford N Barnie
*Assistant Examiner* — Terrence R Willoughby
(74) *Attorney, Agent, or Firm* — Dinsmore & Shohl LLP

(57) ABSTRACT

A charging device includes: a plurality of legs including respective upper and lower arms having respective switching elements, the upper and lower arms being connected to a battery and a negative pole of a DC charger, respectively; a motor having three phases with a neutral point connected to a positive pole of the DC charger; a driver that drives the switching elements with respective PWM signals; and a controller that monitors a current from the legs to the battery, and instructs the driver to apply duty ratios of the PWM signals so that a fluctuation width of the monitored current is reduced. Further, the controller monitors the measurement result of the sensor at a period other than 1/N of a period of a carrier of the PWM signals, where N is a number of the plurality of legs used for charging the battery.

3 Claims, 5 Drawing Sheets

(56) References Cited

U.S. PATENT DOCUMENTS

2021/0380005 A1\* 12/2021 Bin ........................ B60L 50/51
2022/0077709 A1\* 3/2022 Liu ..................... H02M 7/5387

\* cited by examiner

CHARGING DEVICE

CROSS-REFERENCE TO RELATED APPLICATION (S)

The present application claims priority to and incorporates by reference the entire contents of Japanese Patent Application No. 2023-028533 filed in Japan on Feb. 27, 2023.

BACKGROUND

The present disclosure relates to charging devices.

As a disclosure relating to charging of an electric vehicle, for example, there is a power converter disclosed in Japanese Laid-open Patent Publication No. 2018-93608. The power converter has three switch circuits, a reactor, an input smoothing capacitor, and an output smoothing capacitor. The electric power conversion equipment lowers the input voltage by operating three switch circuits as interleave circuits of two or three phases, and charges the on-board power storage equipment. The switch circuitry of each phase consists of a semi-conductor switch of the upper and lower arms, each driven by a Pulse Width Modulation (PWM) signal.

SUMMARY

There is a need for suppressing the fluctuation of the current for charging the power storage device mounted on the vehicle.

According to an embodiment, a charging device includes: a plurality of legs including respective upper arms and lower arms, the upper arms including respective switching elements, the lower arms including respective switching elements, each of the upper arms and each of the lower arms in each of the legs being connected in series, the upper arms being connected to a battery mounted on a vehicle, and the lower arm being connected to a negative pole of a DC charger; a motor having three phases including respective coils, the coils being connected to respective middle points between the upper arms and the lower arms, and a neutral point of the motor being connected to a positive pole of the DC charger; a driver that drives the switching elements with respective PWM signals; and a controller that monitors a measurement result of a sensor for measuring a current from the plurality of legs to the battery, and instructs the driver to apply duty ratios of the PWM signals so that a fluctuation width of the monitored current is reduced based on the fluctuation width of the monitored current. Further, the controller monitors the measurement result of the sensor at a period other than 1/N of a period of a carrier of the PWM signals, where N is a number of the plurality of legs used for charging the battery.

DETAILED DESCRIPTION

In the interleave circuit, ripples occur in the current of the output for the switching operation by PWM signal is performed in the switch circuit of each phase. In the power converter disclosed in Japanese Laid-open Patent Publication No. 2018-93608, although the duty ratio of PWM signal in order to suppress the ripple is set to a predetermined duty ratio in accordance with the number of phases of the interleave circuit, when driving with a PWM signal because there is a delay such as on-off of the dead time and the switch circuit, PWM signal to be outputted there is a possibility that the ripple is generated without the predetermined duty ratio.

Hereinafter, the embodiment of this disclosure is described in detail based on Drawings. Note that the present disclosure is not limited by the embodiments described below.

Embodiments

Figure 1:
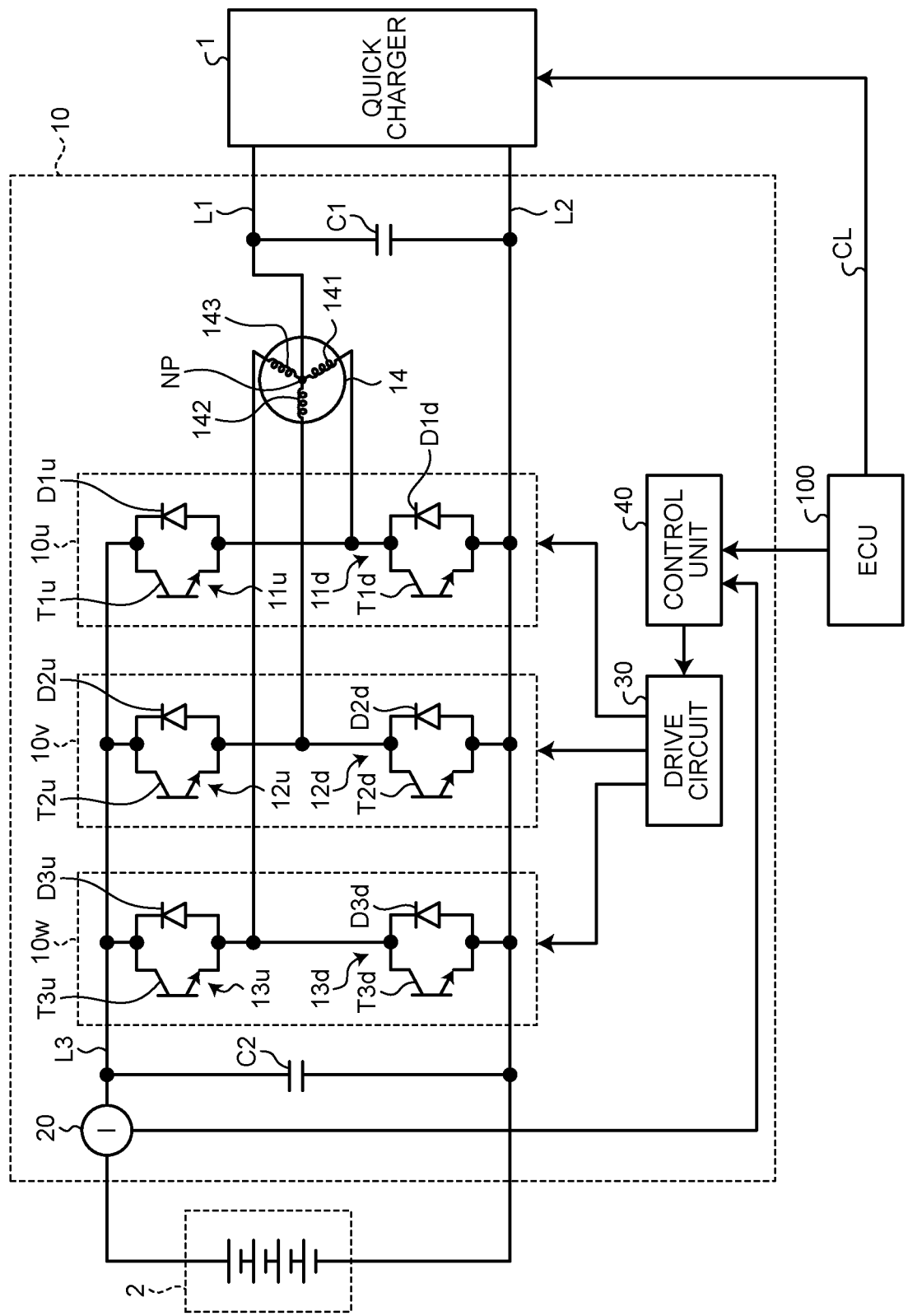
FIG. 1 is a block diagram illustrating a configuration of a charging device 10 according to the embodiment.

FIG. 1 is a block diagram illustrating a configuration of a charging device 10 according to an embodiment of the present disclosure. The charging device 10 is mounted on, for example, an electric vehicle (Battery Electric Vehicle: BEV). The electric vehicle is provided with a secondary battery 2 capable of charging and discharging. The secondary battery 2 is a power storage device for supplying power to the motor 14 for driving the driving wheels of an electric vehicle. The charging device 10 is connected to the quick charger 1 installed in the charging station of an electric vehicle, to charge the secondary battery 2 from the quick charger 1 with electric power supplied by direct current.

The charging device 10 includes legs 10u, 10v, 10w, a motor 14, a current sensor 20, a drive circuit 30, a control unit 40, and capacitors C1, C2. The charging device 10 has a first power line L1 connected to the positive pole of the connector of the quick charger 1 and a second power line L2 connected to the negative pole of the connector of the quick charger 1. One end of the capacitor C1 is connected to the first power line L1, the other end of the capacitor C1 is connected to the second power line L2.

The motor 14 is a three-phase motor serving as a power source for driving the driving wheels of an electric vehicle. The motor 14 includes stator coils 141, 142, 143 as reactors. The stator coils 141, 142 and 143, when charging the secondary battery 2 in the quick charger 1, performs storage and release of electrical energy supplied from the quick charger 1. The stator coils 141, 142, 143 are connected at one end to the neutral point NP of each. The other end of the stator coil 141 is connected to the leg 10u, the other end of the stator coil 142 is connected to the leg 10v, the other end of the stator coil 143 is connected to the leg 10w. The neutral point NP is connected to the first power line L1.

The leg 10u, 10v, 10w is a circuit for boosting the voltage applied from the quick charger 1, and controls the storage of electrical energy from the quick charger 1 to the stator coils 141, 142, 143 and the discharge of electrical energy from the stator coils 141, 142, 143. The legs 10u, 10v, 10w are provided in parallel between the third power line L3 connected to the positive electrode of the secondary battery 2 and the second power line L2 connected to the negative electrode of the secondary battery 2.

A set of leg 10*u* and stator coils 141, a set of leg 10*v* and stator coils 142, and a set of leg 10*w* and stator coils 143 each serve as a power conversion circuitry for single phase power conversion. The legs 10*u*, 10*v*, 10*w* are driven by PWM signals supplied from the drive circuit 30. By shifting the phase of PWMs for driving the legs 10*u*, 10*v*, 10*w*, it is possible to perform the power transformation of the interleave scheme. The legs 10*u*, 10*v*, 10*w* function as a three-phase interleave when the phase differential is 120 degrees for legs 10*u*, 10*v*, 10*w* to provide the PWMs. The legs 10*u*, 10*v*, 10*w* circuit functions as a two-phase interleaver when one of the legs 10*u*, 10*v*, 10*w* is stopped and the phase differential is 180 degrees for the remaining two to provide a PWM.

The leg 10*u* has an upper arm 11*u* and a lower arm 11*d*. The upper arm 11*u*, the switching element T1*u* and the diode D1*u* are connected in parallel, the lower arm 11*d*, the switching element T1*d* and the diode D1*d* are connected in parallel. The upper arm 11*u*, the cathode side of the diode D1*u* is connected to the third power line L3, the anode side of the diode D1*u* is connected to the lower arm 11*d* and the stator coil 141. The lower arm 11*d*, the cathode side of the diode D1*d* is connected to the anode side of the diode D1*u*, the anode side of the diode D1*d* is connected to the second power line L2. The switching element T1*u* and the switching element T1*d* are, for example, Insulated Gate Bipolar Transistor (IGBT) or Metal Oxide Semiconductor Field Effect Transistor (MOSFET) and the like. The diode D1*u* and the diode D1*d* are diodes for recirculating current.

The leg 10*v* has an upper arm 12*u* and a lower arm 12*d*. The upper arm 12*u*, the switching element T2*u* and the diode D2*u* are connected in parallel, the lower arm 12*d*, the switching element T2*d* and the diode D2*d* are connected in parallel. The upper arm 12*u*, the cathode side of the diode D2*u* is connected to the third power line L3, the anode side of the diode D2*u* is connected to the lower arm 12*d* and the stator coil 142. The lower arm 12*d*, the cathode side of the diode D2*d* is connected to the anode side of the diode D2*u*, the anode side of the diode D2*d* is connected to the second power line L2. The switching element T2*u* and the switching element T2*d* is, for example, such as IGBT or MOSFET. The diode D2*u* and the diode D2*d* are diodes for recirculating current.

The leg 10*w* has an upper arm 13*u* and a lower arm 13*d*. The upper arm 13*u*, the switching element T3*u* and the diode D3*u* are connected in parallel, the lower arm 13*d*, the switching element T3*d* and the diode D3*d* are connected in parallel. The upper arm 13*u*, the cathode side of the diode D3*u* is connected to the third power line L3, the anode side of the diode D3*u* is connected to the lower arm 13*d* and the stator coil 143. The lower arm 13*d*, the cathode side of the diode D3*d* is connected to the anode side of the diode D3*u*, the anode side of the diode D3*d* is connected to the second power line L2. The switching element T3*u* and the switching element T3*d* is, for example, such as IGBT or MOSFET. The diode D3*u* and the diode D3*d* are diodes for recirculating current.

One end of the capacitor C2 is connected to the third power line L3, the other end of the capacitor C2 is connected to the second power line L2. The capacitor C2 is a capacitor for smoothing the current to charge the secondary batteries 2. The current sensor 20 is a sensor for measuring the current value of the current flowing through the third power line L3. The current sensor 20 outputs a signal indicating the measurement result to the control unit 40. The drive circuit 30 is a circuit for outputting a PWM for driving the respective arms of the leg 10*u*, 10*v*, 10*w*. The drive circuit 30 outputs a PWM signal corresponding to the duty ratio instructed from the control unit 40.

Figure 2:
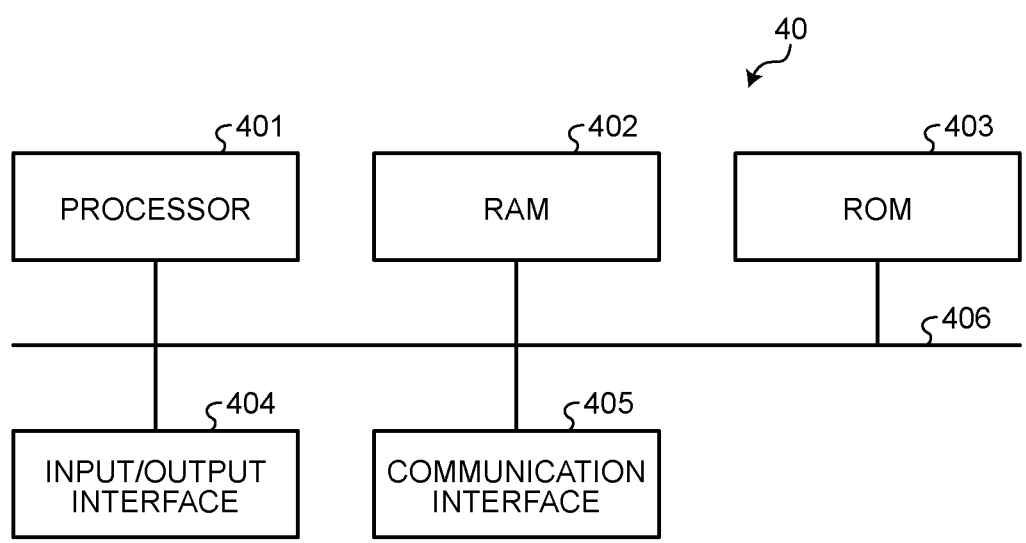
FIG. 2 is a block diagram illustrating a configuration of a control unit.

The control unit 40 includes a function of instructing the duty cycle of PWM signal outputted from the drive circuit 30. FIG. 2 is a block diagram illustrating a configuration of a control unit 40. The control unit 40 includes a processor 401, a Random Access Memory (RAM) 402, a Read Only Memory (ROM) 403, an input/output interface 404, and a communication interface 405 connected to the bus 406.

The RAM 402 consists of volatile memories. The RAM 402 is a workspace when the processor 401 performs the arithmetic processing, and stores the result of the arithmetic processing of the processor 401. The ROM 403 consists of non-volatile memories. The ROM 403 stores programs used by the processor 401 to perform arithmetic operations. The input-output interface 404 acquires a signal output by the current sensor 20. The communication interface 405 includes a communication module for performing wireline information communication. The communication interface 405 communicates with an Electronic Control Unit (ECU) 100.

The processor 401 is, for example, a Central Processing Unit (CPU), which reads the program from the ROM 403 and executes the RAM 402 as a workspace. The processor 401 may be a Field-Programmable Gate Array (FPGA), a Digital Signal Processor (DSP), or a Graphics Processing Unit (GPU). The processor 401 executes the program to provide a function for controlling the duty cycle of the PWM.

The ECU 100 is a host device that controls the main control of the drivetrain of the car. The ECU 100 is connected to the connecter of the quick charger 1 by a communication line CL. The ECU 100 performs information communication with the quick charger 1 via the communication line CL, the information of the voltage when the quick charger 1 performs charging of the secondary battery 2 from the quick charger 1. The ECU 100 transmits the information-voltage obtained from the quick charger 1 to the control unit 40.

Figure 3:
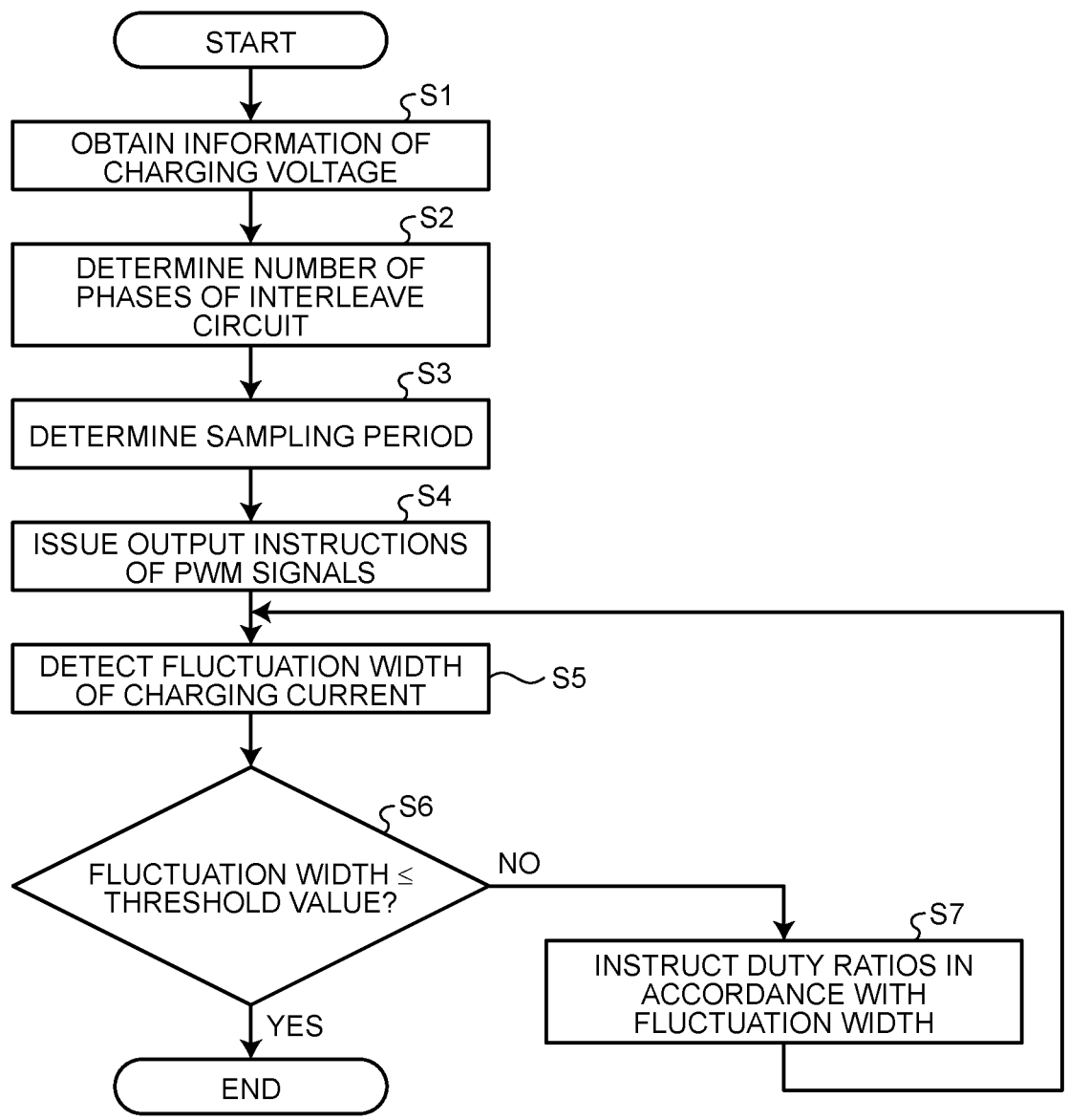
FIG. 3 is a flowchart illustrating a flow of processing that the control unit executes.

Next, an operation example of the charging device 10 is described. FIG. 3 is a flowchart illustrating a flow of processing that the control unit 40 executes. When the first power line L1, the second power line L2, and the communication line CL are connected to the quick charger 1 by the connecter, the ECU 100 communicates with the quick charger 1 to obtain information of the voltage when the charge of the secondary battery 2. The ECU 100 sends this information to the control unit 40. The control unit 40 acquires information indicating the voltage of the charge sent from ECU 100 (step S1).

Next, the control unit 40 determines the number of phases of the interleave circuit for driving to charge the secondary battery 2, in accordance with the voltage indicated by the information acquired in step S1 (step S2). For example, the charging voltage of the quick charger 1 is 400V, when the voltage for charging the secondary battery 2 is 800V, the number of phases is set to 2. Further, the charging voltage of the quick charger 1 is 400V, when the voltage for charging the secondary battery 2 is 1200V, the number of phases is set to 3.

Next, the control unit 40 determines the sampling period of the signal outputted from the current sensor 20 (step S3). Here the control unit 40 determines the sampling period in accordance with the number of phases determined by step S2. The control unit 40, when the number of phases determined in step S2 is N, the sampling period other than 1/N of the carrier period of PWM signals for driving the legs 10u, 10v, 10w. For example, the control unit 40, when operating the leg 10u, 10v, 10w as a two-phase interleave circuit, the sampling period of the signal outputted from the current sensor 20 and a period other than ½ of the carrier period of PWM signal. Further, the control unit 40, when operating the leg 10u, 10v, 10w as a three-phase interleave circuit, the sampling period of the signal outputted from the current sensor 20 and a period other than ⅓ of the carrier period of PWM signal.

Next, the control unit 40 sends an output command for instructing the output of PWM signals to the drive circuit 30 (step S4). This command includes the duty cycle of PWM and the number of phases determined by step S2. The drive circuit 30 outputs PWM signals based on the duty cycle included in the output command, to operate the legs 10u, 10v, 10w as an interleave circuit of the number of phases included in the output command.

Figure 4:
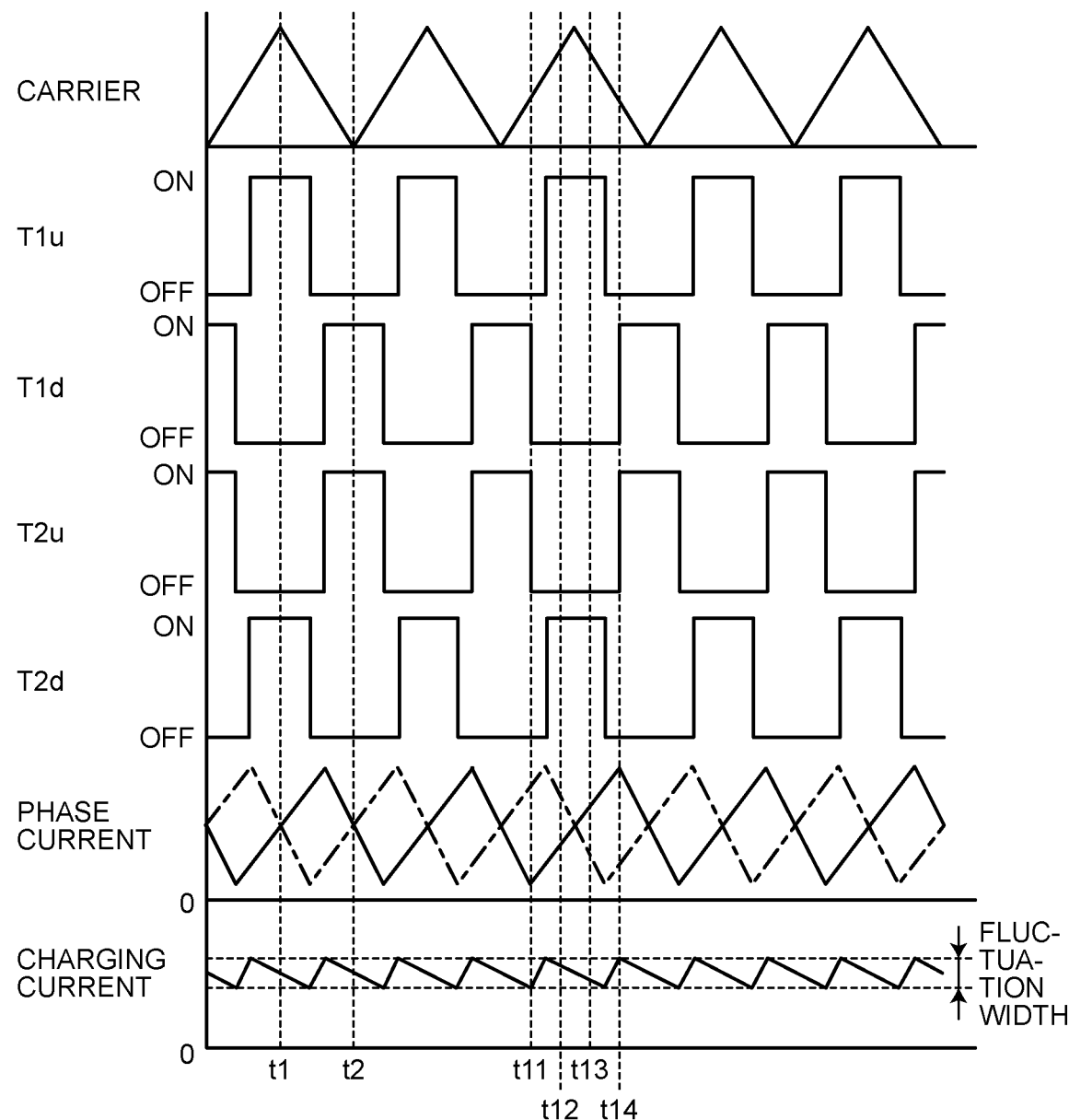
FIG. 4 is a drawing indicating example waveforms of a carrier, PWM signals, a phase current, and a charging current.

FIG. 4 is a drawing illustrating example waveforms of the legs 10u, 10v, 10w operated as a two-phase interleave circuit, the carrier of PWM signals when the control unit 40 outputs a command to the duty cycle of 50%, PWM signal, a phase current, and a diagram showing an example of a waveform of the charge current flowing through the secondary battery 2.

If the command to 50% duty ratio is output, when driving the legs 10u, 10v as a two-phase interleave circuit, the dead time, on delay of the switching element, there is an off delay of the switching element, the PWM signals driving circuit 30 output to the switching elements T1u, T1d, T2u, T2d, the duty ratio as illustrated in FIG. 4 becomes smaller than 50%. In this case, for example, driving the legs 10u, 10v, when the two-phase interleave circuit by stopping the leg 10w, the phase current flowing between the leg 10u and the stator coil 141 becomes a waveform of a solid line illustrated in FIG. 4, the phase current flowing between the leg 10v and the stator coil 142 is a waveform of a chain line illustrated in FIG. 4. In the charging current, since the sum of the current flowing from the leg 10u, 10v of the two-phase interleave circuit, a ripple occurs as illustrated in FIG. 4 which varies in accordance with the phase current.

The control unit 40 samples the charging current at the sampling period determined by the step S3, detects the fluctuation of the charging current (step S5). Incidentally, when the sampling period is 1/N of the carrier period, for example, sampling is performed at the timing of t1, t2 illustrated in FIG. 4. In this case, the charging current will be detected as a constant value, it is impossible to detect the fluctuation of the charging current. On the other hand, in the present embodiment, the sampling period is other than 1/N of the carrier period, the sampling is performed at the timing of t11, t12, t13, t14 illustrated in FIG. 4, for example. In this case, since the charging current is not detected as a constant value, the control unit 40 can detect the fluctuation width of the charging current.

Next, the control unit 40 determines whether the fluctuation range of the detected charge current is equal to or less than a predetermined threshold value (step S6). Here, the threshold is, for example, the fluctuation width of the allowable charging current at the time of charging of the secondary battery 2. The control unit 40, when the fluctuation range of the charge current is equal to or less than a predetermined threshold value (YES in step S6), ends the process of FIG. 3.

The control unit 40, if the fluctuation width of the charging current exceeds a predetermined threshold value (NO in step S6), instructs the duty cycle of the PWM signals in accordance with the fluctuation width of the charging current detected by step S5 to the drive circuit 30 (step S7). Specifically, the control unit 40 sets the duty ratio so that the fluctuation range of the charging current is reduced, and sends an output command including the set duty ratio to the drive circuit 30, returns the process flow to step S5.

For example, the control unit 40 sends the output command by increasing the duty ratio instructed in step S7 by a predetermined amount than the duty ratio instructed in step S4 to the drive circuit 30.

In a case where after issuing the output instructions to increase the duty ratios in step S7 by a predetermined amount with respect to the duty ratio in step S4 and detecting that the fluctuation width obtained by detecting the fluctuation width of the charging current is greater, the control unit 40 repeats the operations to issue instructions to the drive circuit 30 to reduce the duty ratio by a predetermined amount until the fluctuation width of the charging current is equal to or less than a threshold value.

Figure 5:
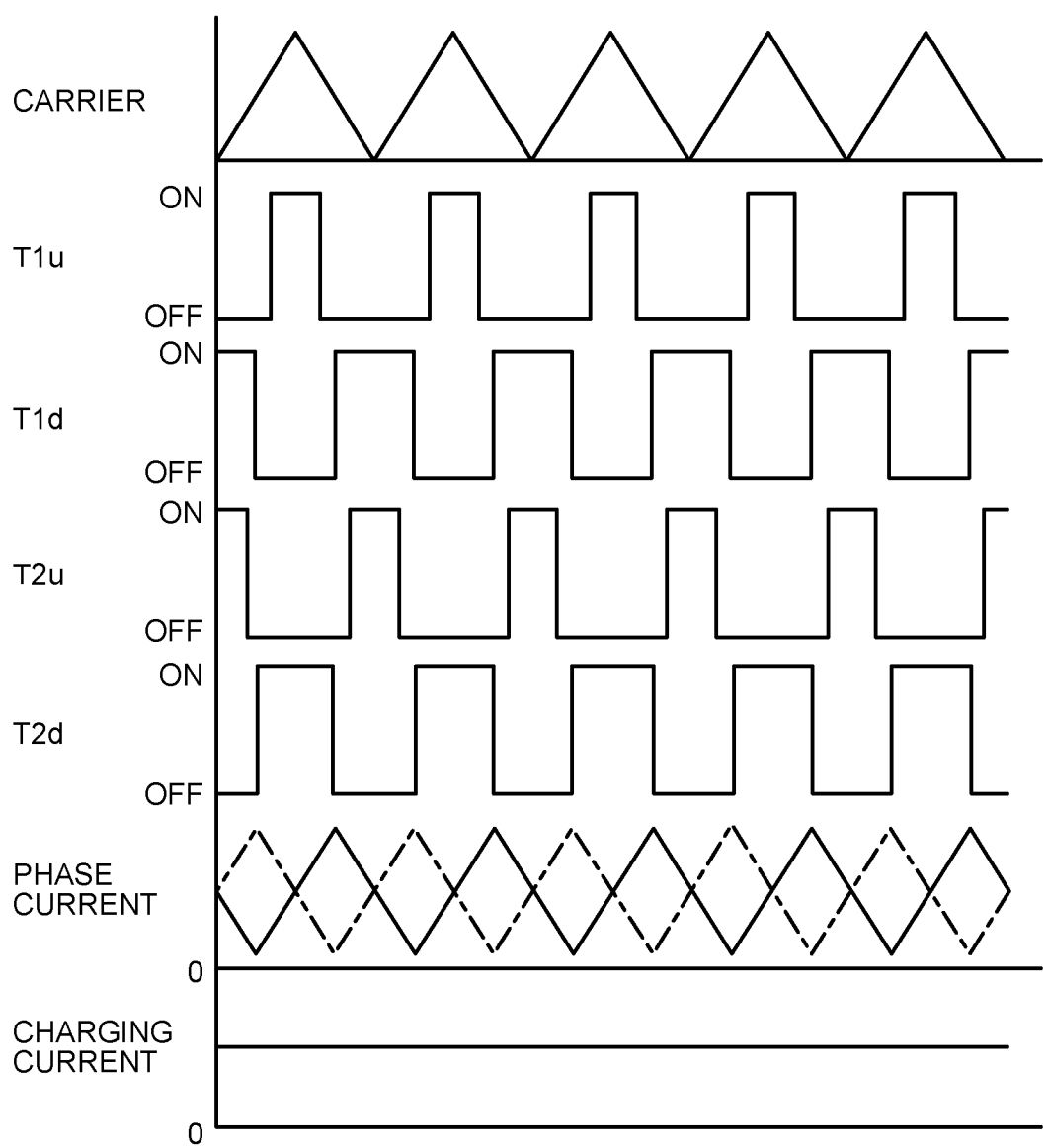
FIG. 5 a drawing indicating other example waveforms of the carrier, the PWM signals, the phase current, and the charging current.

FIG. 5 illustrates example waveforms of the carrier of the PWM, the PWM signals, the phase current, and the charging current flowing to the secondary battery 2 when the legs 10u, 10v. 10w are operated by the two-phase interleave circuit to change the duty ratios of the PWM signals, and the fluctuation width of the charging current is equal to or less than a threshold value.

When the control unit 40 controls the duty ratios in accordance with the detection result of the charging current, the waveform of the phase current flowing the leg 10u is illustrated in FIG. 5 in solid line, the waveform of the phase current flowing the leg 10v is illustrated in FIG. 5 in chain line. Since the charge current is a combination of those currents from the legs 10u and 10v, the waveform of the charge current is illustrated in FIG. 5 in which the fluctuation is suppressed.

According to the present embodiment as described above, by controlling the duty cycle of PWM for driving the leg 10u, 10v, 10w, it is possible to suppress the ripple of the charge current. Further, since the ripple of the charge current can be suppressed, it is possible to reduce the capacitance of the capacitor C2.

Further, according to the present embodiment, the period of the sampling of the charging current by a 1/N other than the carrier period of PWM signal, it is possible to detect the fluctuation of the charging current.

Modification

While embodiments of the present disclosure have been described above, the present disclosure is not limited to the above-described embodiments, and can be implemented in various other forms. For example, the above-described embodiments may be modified as follows to implement the present disclosure. Incidentally, the embodiments described above and the following modifications may be combined each other. Components configured by appropriately combining the components of the embodiments and modifications described above are also included in the present disclosure. Further effects and fluctuations can also be readily derived by those skilled in the art. Therefore, the wider aspect of the present disclosure is not limited to the above embodiments and modifications, and various modifications can be made.

In the present disclosure, a current sensor 20 may be provided between the neutral point NP and the quick charger 1.

In the present disclosure, a switch for connecting the first power line L1 and the third power line L3, may be provided a switch for connecting the neutral point NP of the first power line L1 and the stator coils 141, 142, 143. In this instance, when charging the secondary battery 2 without boosting the voltage of the quick charger 1, the switch between the first power line L1 and the third power line L3 is turned on to connect the first power line L1 and the third power line L3, the switch between the first power line L1 and the neutral point NP is turned off to disconnect the first power line NP from the neutral point. Further, when charging the secondary battery 2 by boosting the voltage of the quick charger 1, the switch between the first power line L1 and the third power line L3 as off, disconnect the first power line L1 from the third power line L3, the switch between the first power line L1 and the neutral point NP on to connect the first power line L1 and the neutral point NP.

In the charging apparatus according to the present disclosure, an effect can be obtained in which it is possible to suppress the fluctuation of the current for charging the power storage device mounted on the vehicle.

According to an embodiment, it is possible to reliably monitor the fluctuation of the current flowing through the power storage device, and to control the duty cycle of PWM signal based on the fluctuation of the current, thereby suppressing the fluctuation of the current for charging the power storage device mounted on the vehicle. Thus, the driving of the driving wheel by the motor, it is possible to perform the charging of the power storage device from the charger.

According to an embodiment, the driving of the driving wheel by the motor, it is possible to perform the charging of the power storage device from the charger.

According to an embodiment, it is possible to charge the storage device with a charger of various voltages.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charging device comprising:
    a plurality of legs including respective upper arms and lower arms, the upper arms including respective switching elements, the lower arms including respective switching elements, each of the upper arms and each of the lower arms in each of the legs being connected in series, the upper arms being connected to a battery mounted on a vehicle, and the lower arm being connected to a negative pole of a DC charger;
    a motor having three phases including respective coils, the coils being connected to respective middle points between the upper arms and the lower arms, and a neutral point of the motor being connected to a positive pole of the DC charger;
    a driver that drives the switching elements with respective PWM signals; and
    a controller that monitors a measurement result of a sensor for measuring a current from the plurality of legs to the battery, and instructs the driver to apply duty ratios of the PWM signals so that a fluctuation width of the monitored current is reduced based on the fluctuation width of the monitored current, wherein
    the controller monitors the measurement result of the sensor at a period other than 1/N of a period of a carrier of the PWM signals, where N is a number of the plurality of legs used for charging the battery.

2. The charging device according to claim 1, wherein the motor drives wheels of the vehicle.

3. The charging device according to claim 1, wherein
    a number of the plurality of legs used for charging the battery is determined based on a voltage of the DC charger and a voltage of the battery.

* * * * *